United States Patent [19]

Schneider

[11] Patent Number: 4,670,148

[45] Date of Patent: Jun. 2, 1987

[54] APPARATUS AND METHOD FOR WITHDRAWING GASEOUS DECOMPOSITION PRODUCTS FROM A REFUSE DUMP

[76] Inventor: Reinhard Schneider, Lonystrasse 9, 6300 Giessen, Fed. Rep. of Germany

[21] Appl. No.: 796,638

[22] Filed: Nov. 8, 1985

[30] Foreign Application Priority Data

Nov. 10, 1984 [DE] Fed. Rep. of Germany ....... 3441158

[51] Int. Cl.⁴ .......................... C02F 3/28; E21B 43/22
[52] U.S. Cl. ..................................... 210/603; 210/614; 210/747; 210/170; 210/96.1; 210/901; 48/111; 48/190; 48/197 A; 166/246; 166/250; 405/129; 73/19
[58] Field of Search ............... 166/246, 250, 278, 369; 210/603, 747, 170, 96.1, 901, 614, 85, 218; 48/197 A, 190, DIG. 10, 111; 405/129, 128; 73/19

[56] References Cited

U.S. PATENT DOCUMENTS

| | | | |
|---|---|---|---|
| 4,026,355 | 5/1977 | Johnson et al. | 48/197 A |
| 4,323,367 | 4/1982 | Ghosh | 210/603 |
| 4,442,901 | 4/1984 | Zison | 166/369 |
| 4,469,176 | 9/1984 | Zison et al. | 405/129 |
| 4,487,054 | 12/1984 | Zison | 166/369 |
| 4,518,399 | 5/1985 | Croskell et al. | 405/129 |

FOREIGN PATENT DOCUMENTS

| | | | |
|---|---|---|---|
| 59-69195 | 4/1984 | Japan | 210/614 |
| 60-28895 | 2/1985 | Japan | 210/603 |

*Primary Examiner*—Benoit Castel
*Attorney, Agent, or Firm*—Becker & Becker, Inc.

[57] ABSTRACT

An apparatus and method for withdrawing gaseous decomposition products from a refuse dump. Disposed at various locations in the refuse are gas collection mechanisms, such as gas wells, drainage systems, etc., each of which is connected via a gas withdrawal line with a collector, from which the gas is withdrawn for further utilization. Disposed in each gas withdrawal line is a sensor and a regulatable shutoff device. The sensor transmits the content of a characteristic constituent of the gas flow in a given gas withdrawal line to a measuring and control unit, which monitors the gas flow volume as a function of a comparison of the sensor signals with preset threshold values. If the sensors indicate that the content of the characteristic constituent of the gas flow exceeds or drops below the preset threshold values, the measuring and control unit opens or closes the associated shutoff device by an appropriate amount.

20 Claims, 4 Drawing Figures

APPARATUS AND METHOD FOR WITHDRAWING GASEOUS DECOMPOSITION PRODUCTS FROM A REFUSE DUMP

BACKGROUND OF THE INVENTION

1. Field of the Invention

The present invention relates to a method of controlling the withdrawal of gas from a refuse dump via gas collection mechanisms disposed at a distance from one another in various locations in the refuse or garbage. The gaseous decomposition products are conveyed from the gas collection mechanisms to a gas collector, and are then supplied to the consumer via a delivery pipe. The present invention also relates to an apparatus for withdrawing the gaseous decomposition products from the refuse dump, in which refuse or garbage is deposited in a substantially gastight chamber. The gas collection mechanisms are disposed at a distance from one another in various locations in the refuse or garbage, with the gas decomposition products being withdrawn from the gas collection mechanisms via gas withdrawal lines.

In a refuse dump, decay results in gaseous decomposition products that to a large extent contain methane gas. Methane is an inflammable gas, which can lead to fires in the refuse dump. If methane enters a closed space, the danger of explosion exists if the $CH_4$ content in the air reaches 5–15%. If the gaseous decomposition products escape from the refuse dump into the surrounding ground, the methane damages the plants. One must therefore endeavor to withdraw the gaseous decomposition products, and to make them usable from an energy standpoint or burn them off.

2. Description of the Prior Art

It is known from German Patent Applications P 34 24 788.8 and P 34 25 785.3 to deposit the refuse in a chamber. Provided in the refuse are gas collection mechanisms in the form of a gas-drainage-pipe system or in the form of gas wells. The gaseous decomposition products enter these gas collection mechanisms, and are withdrawn from the dump via gas withdrawal lines. A conveying mechanism, such as a pump, blower, etc., conveys the gaseous decomposition products via a delivery pipe to a consumer for commercial use.

It has become evident in practice that even if the chambers are covered, air can be drawn into the refuse. If more gas is withdrawn from the gas collection mechanisms than can subsequently flow out of the refuse, a pressure differential results that favors an increased penetration of air. However, because of the air that is flowing in, too much oxygen enters the refuse, thus impairing, and under unfavorable conditions even destroying, the conditions essential for the life of the bacteria that release the usable methane. The formation of methane is then reduced or is even completely halted. Under certain circumstances, the $CH_4$ content in the withdrawn gas stream is reduced to such an extent that it is no longer possible to commercially utilizes the gas.

In contrast, if fewer gaseous decomposition products are withdrawn than are produced, these gases can escape in an uncontrolled manner into the surroundings, and can produce a permanent danger of explosion. Gaseous decomposition products that pass into the ground damage the surrounding flora. Again, an optimum gas utilization does not result.

An object of the present invention is to withdraw the gaseous decomposition products from a refuse dump in a controlled manner in order, on the one hand, to avoid the penetration of air into the refuse, and on the other hand, to prevent an uncontrollable escape of the gaseous decomposition products from the dump; furthermore, the withdrawn gaseous decomposition products should at all times have an optimally usable methane content.

BRIEF DESCRIPTION OF THE DRAWINGS

These objects, and other objects and advantages of the present invention, will appear more clearly from the following specification in conjunction with the accompanying schematic drawings, in which.

SUMMARY OF THE INVENTION

Figure 1:
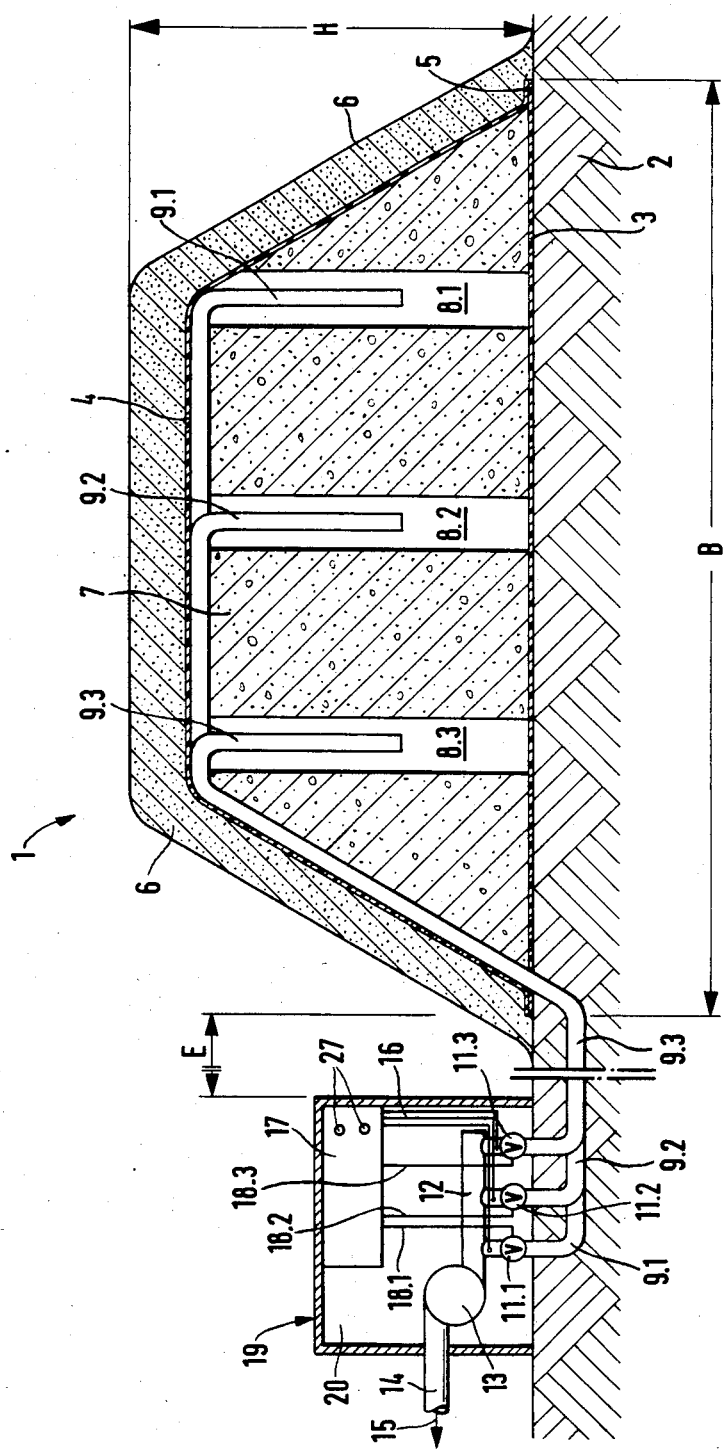
FIG. 1 is a cross-sectional view of one inventive arrangement of a refuse dump having gas wells and a control center.

The method of the present invention is characterized primarily by the steps of: conveying the gaseous decomposition products that accumulate in each of the gas collection mechanisms to the gas collector via separate gas flows; determining in each of the gas flows, each of which is associated with a given one of the gas collection mechanisms, the content of a characteristic constituent or concentration of the gas decomposition products in that gas flow; and restricting the gas flow when the concentration or content of a characteristic constituent thereof exceeds a predetermined first threshold value, and increasing the gas flow when the concentration or content of a characteristic constituent thereof falls below a predetermined second threshold value.

The apparatus of the present invention is characterized primarily by: a separate gas withdrawal line for each gas collection mechanism; a collector into which all of the gas withdrawal lines open, with the gaseous decomposition products being withdrawn from this collector for further use; a respective regulatable shutoff device disposed in each of the gas withdrawal lines; at least one sensor associated with each of the gas withdrawal lines for determining the content of a characteristic constituent of the gaseous decomposition products; and a measuring and control unit with which each of the sensors is connected for transmitting signals thereto; as a function of a signal transmitted to it from a given sensor, the measuring and control unit regulates the shutoff device associated with the given sensor.

With the apparatus of the present invention, the gaseous decomposition products can be withdrawn in a controlled manner in such a way that on the one hand penetration of air is prevented, and on the other hand an uncontrolled escape of the gaseous decomposition products is prevented. The methane content of the gaseous decomposition products supplied to the consumer via the delivery pipe can be kept approximately uniform within narrow ranges, so that it is possible to have an excellent, optimum commercial utilization.

The regulation of the withdrawn gas volume flow assures that always only that amount of gas is withdrawn that the bacteria produce. This assures a high-quality gas having a substantially uniform methane content that under certain circumstances can even be kept relatively low. It is precisely this controllable uniformity of the methane content that is critical for many users, since in this way an adaptation of the gas motors, burners, etc., that are supplied with the gaseous decomposition products, to different grades of the gas can be eliminated.

The shutoff devices are advantageously disposed in each of the gas withdrawal lines in the region of the collector; the sensors can be disposed in front of or after each of the shutoff devices when viewed in the direction of flow. It can also be advantageous to dispose the sensor associated with a given gas withdrawal line in the gas collection mechanism corresponding to that gas withdrawal line. If the sensors determine the $O_2$ content of the gas flowing through the line, when this $O_2$ content increases past a predetermined threshold value, for example when air penetrates into the dump or the gas collection mechanisms, the measuring and control unit activates the shutoff valve associated with that sensor in the same gas withdrawal line to at least somewhat close this shutoff valve, thus restricting the flow of the gas until the $O_2$ content has again dropped below the threshold value. If during the course of further withdrawal of gas the $O_2$ value falls below a predetermined minimum threshold value, for example if an increased quantity of gaseous decomposition products is released, the measuring and control unit opens the associated shut-off device in the same gas withdrawal line further in order to increase the gas volume withdrawn until the predetermined minimum threshold value is again exceeded. A measuring and control unit of this type can also be advantageously regulated as a function of the $N_2$, $CO_2$ or $CH_4$ values in the conveyed gaseous decomposition product flow.

The data transmitted to the measuring and control unit can be fed to a central control station via an external line, preferably in digitallized form. With such a central control station, which can be located as far as 100 km to 500 km from the site of the dump, a number of dump control centers can be monitored, with such control centers essentially comprising a measuring and control unit with the associated sensors and shutoff devices. It is furthermore possible to couple an alarm mechanism with the measuring and control unit; this alarm mechanism is preferably integrated into the housing of the measuring and control unit. The alarm signal can also be transmitted directly to the central control station, where it can be displayed.

The control center of the dump is preferably disposed in a steel container that can be placed in a favorable location at a predeterminable distance from the refuse dump. In this manner, the control center is, among other things, easily replaceable, especially in the event of break down, so that the withdrawal of the gaseous decomposition products from the refuse dump is continually assured without significant interruption. Furthermore, the containers can advantageously be manufactured in such a way that they are completely operational.

Further embodiments and advantageous features of the present invention will be described subsequently.

DESCRIPTION OF PREFERRED EMBODIMENTS

Referring now to the drawings in detail, the formation of a refuse dump, its arrangement in the ground, the formation of the gastight chamber for the refuse, and the arrangement of wetting and drainage systems, heating or cooling systems, as well as the gas collection mechanism (gas wells or fountains, gas-drainage-pipe system) are described in detail in the aforementioned German Patent Applications P 34 25 788.8 and P 34 25 785.3. These applications are hereby incorporated herein by this reference thereto.

The refuse dump 1 illustrated in FIG. 1 is deposited on a preferably level base 2. A substantially gastight base cover 3, preferably made of PVC, is spread over the base 2; the refuse 7 is deposited upon this base cover 3. The deposited refuse is covered with a similarly substantially gastight cover 4 that is preferably made of PVC. The edges 5 of the covers 3 and 4 are glued or fused together in a gastight manner, thus forming an essentially gastight chamber for the refuse 7. An earth covering 6 is placed over the cover 4.

The refuse dump 1 has a height H of about 10 m to 50 m, with the earth covering 6 having a thickness of about 1 m to 2 m. The side walls of the dump 1 preferably have a slope of about 35°. The width B of the refuse dump 1, measured directly above the base 2, is approximately 100 m to 500 m.

In order on the one hand to protect the covers 3 and 4 from mechanical damage, and on the other hand to assure a uniform distribution of the internal gas pressure of the chamber onto the covers, it can be advantageous to provide an approximately 10 cm to 40 cm thick layer of fine gravel or sand between the refuse 7 and the covers 3 and 4.

Provided in the refuse dump 1 are preferably vertical gas wells or gas collector mechanisms 8 that extend over the entire height of the refuse pile. The number of gas wells or fountains 8 is selected in conformity with the size of the dump, the type of refuse 7, and the quantity of gaseous decomposition products that are anticipated. In the illustrated embodiment, in the sectional view shown three individual gas wells 8.1, 8.2, and 8.3 are disposed next to, and at a distance from, one another. A gas withdrawal line 9, in particular 9.1, 9.2, and 9.3, is respectively associated with each of the gas wells 8. One end of a given gas withdrawal line 9 extends approximately centrally and approximately half way into a given gas well 8. All of the gas collection mechanisms can also be provided with horizontal drainage means.

In the illustrated embodiment, the individual gas withdrawal lines 9.1 to 9.3 extend just below the cover 4 along the cover and one incline of the refuse dump 1; these gas withdrawal lines are guided into the ground of the base 2, for which purpose they pass in a gastight manner through the edge region of the base cover 3. In the embodiment of FIG. 1, the lines 9.1 to 9.3 are disposed one after the other in the plane of the section. However, it may be expedient to dispose the lines one above the other.

The gas withdrawal lines 9, preferably disposed in the ground, are guided to a control center 19 provided in a building or structure 20, or a detached or separate container 21 (FIG. 2), installed at any desired distance E from the refuse dump 1. The structure or container is preferably disposed near the dump. The lines 9 are guided from below into the structure 20 or the container 21, and open via shutoff devices 11 (i.e. 11.1, 11.2, and 11.3) into a collector in the form of the pipe 12. By means of a conveying mechanism 13 (a pump, blower, compressor, etc.), the gaseous decomposition products are suctioned or withdrawn from the gas wells 8 and are supplied via a pressure line or delivery pipe 14, in the direction of the arrow 15, to a customer or consumer for commercial use.

The gas withdrawal lines 9 are preferably made of PVC, and have a diameter of from 60 mm to 150 mm. The delivery pipe 14 that is supplied from the conveying mechanism 13 and leads to the consumer, preferably has a diameter of approximately 100 mm to 300 mm.

The gas produced during the decomposition of the refuse contains a large amount of methane and passes through the gas permeable walls of the gas wells 8 and into the latter, from where the gas is withdrawn via a partial vacuum. If the vacuum is too great, atmospheric air, and hence oxygen, are drawn into the refuse 7 through the covers (earth covering 6 or covers 3 and 4), which are not always airtight; this intake of air is detrimental to the bacteria that release the methane gas, since the oxygen impairs or even destroys the conditions essential for the life of the bacteria. The rate of delivery of methane gas can thus be reduced significantly.

In contrast, if more gaseous decomposition product flows into a gas well 8 than can be withdrawn by vacuum via an associated line 9, there exists the danger that the gas can escape in an uncontrolled manner into the surrounding ground and the atmosphere via the covers 3 and 4, which are not always airtight. Together with a certain amount of oxygen from the atmosphere, the methane forms an explosive mixture that endangers the surroundings (enclosures, such as basements of buildings, that are up to 300 m from the dump). Furthermore, methane that passes into the ground damages nearby plants.

Figure 2:
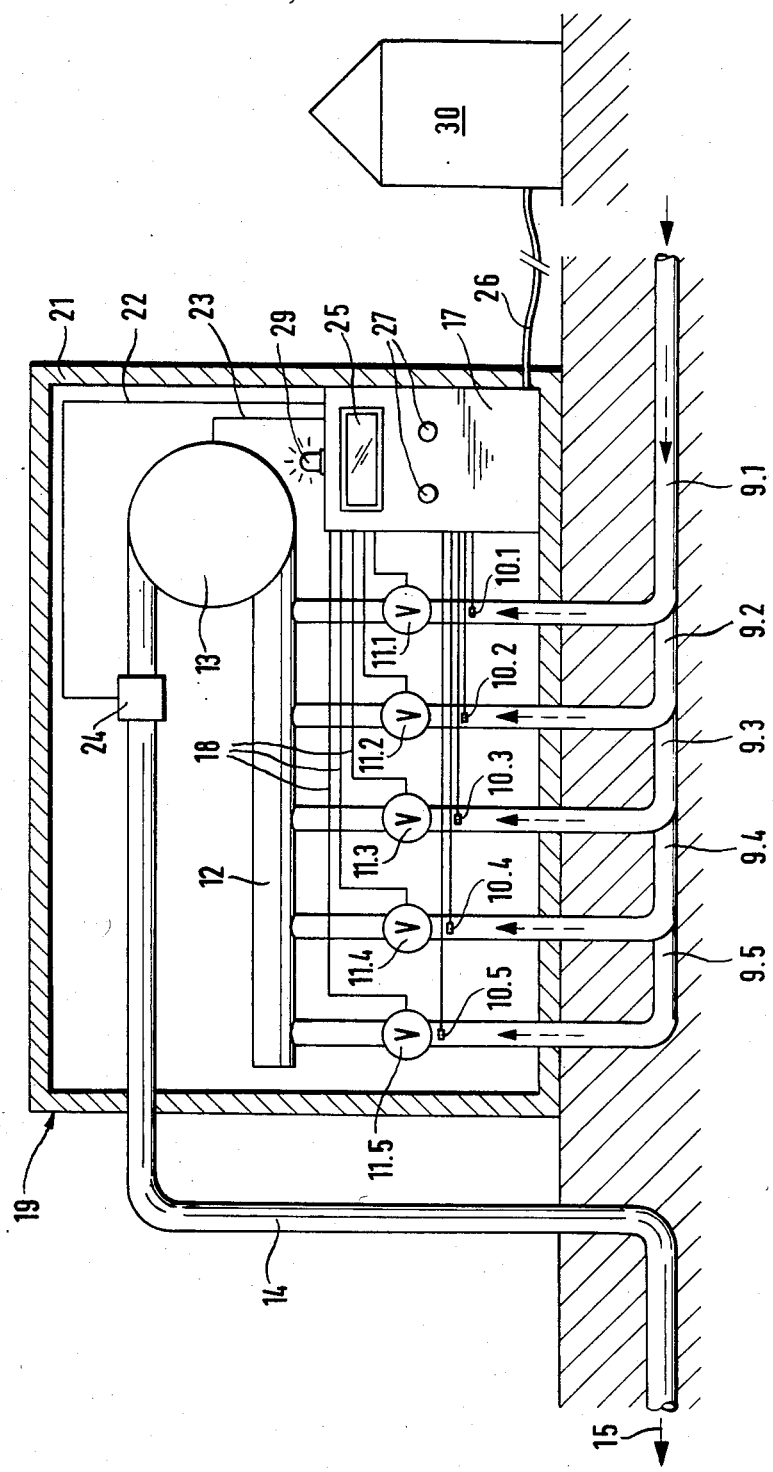
FIG. 2 is a cross sectional view of a different inventive embodiment of a control center in a container.

In the control center 19 illustrated in FIGS. 1 and 2, a respective sensor 10.1, 10.2, and 10.3 is disposed in each of the lines 9 after (when viewed in the direction of the flow of the gas) the shutoff devices 11.1, 11.2, and 11.3, which are in the form of control valves. These sensors 10.1 to 10.3 measure, for example, the concentration of nitrogen (N), carbon dioxide ($CO_2$), methane ($CH_4$), and preferably the oxygen concentration ($O_2$) of the gaseous decomposition products that are flowing through the lines 9. The sensors 10 emit signals in conformity to the N, $CO_2$, $CH_4$, or $O_2$ concentrations. These signals are transmitted via electrical lines 16 to a measuring and control unit 17. As a function of the determined measured values, this unit 17, via control lines 18, regulates the control valves 11 in order to automatically regulate the volume of the flow of the gaseous decomposition products withdrawn from a given gas well 8.

The output signals of the sensors 10 can be continuously detected by the measuring and control unit 17 in order to immediately initiate appropriate countermeasures (closed control loop). However, in order to reduce the electronic outlay in the measuring and control unit 17, it may be advantageous to scan the sensors only one time within a certain time interval, and to activate the appropriate control valve 11 via the corresponding control line 18.

Thus, for example, the sensor 10.1 determines the oxygen ($O_2$) content of the withdrawn gaseous decomposition products, and transmits a signal conforming to this content to the measuring and control unit 17 via an electrical line 16. As soon as the predetermined threshold value for $O_2$ in the line has been exceeded, the measuring and control unit 17 reduces the cross-sectional area of the pretaining gas line 9 via the corresponding control valve 11.

This reduces the quantity of gas that is withdrawn until the oxygen content again drops below the predetermined maximum threshold value.

If the $O_2$ content determined by the sensor 10 drops below a predetermined minimum threshold value, the measuring and control unit 17 effects an opening of the pertaining control valve 11 in order to increase the quantity of gas withdrawn until the $O_2$ value that is determined again lies within the range of the predetermined threshold values.

In this manner, the $O_2$ content of the withdrawn gaseous decomposition products is kept within predetermined threshold values, as a result of which the quality of the withdrawn gas, in other words, the amount of methane ($CH_4$) thereof, can be kept relatively high and constant. The withdrawn gas can therefore be optimally utilized by the consumer.

Furthermore, the above-outlined procedure guarantees that neither air penetration occurs, which retards the decomposition process in the refuse and reduces the production of methane gas, nor methane gas escapes in an uncontrolled manner into the atmosphere or into the ground.

It can also be advantageous to determine selectively, or in addition to the determination of the $O_2$ content, for example the $N_2$ (nitrogen) content, the $CO_2$ content, or the $CH_4$ content, and to control the quantity of gas withdrawn as a function of these values.

The threshold values (maximum and minimum threshold values) that are to be preset as comparison values, are input into the measuring and control unit 17 via input members 27. In addition, errors can be recognized with the measuring and control unit 17. For example, penetration of air into a gas well can be recognized by the permanent exceeding of the predetermined $O_2$ threshold value, since despite the countermeasures initiated by the measuring and control units 17 (namely closure of the control valve), the $O_2$ value does not drop below the predetermined maximum threshold value.

FIG. 2 shows a steel container 21 that is provided with appropriate connections for the electrical lines and gas lines. Thus, the container 1 can be placed at any desired site without extensive structural measures being required. The container can be manufactured in a plant in such a way that it is ready for operation.

Five gas withdrawal lines 9.1 to 9.5 are illustrated in the embodiment of FIG. 2. Gaseous decomposition products are withdrawn from non-illustrated gas wells, such as of the type illustrated in FIG. 1, via these gas withdrawal lines. As was the case with the embodiment of FIG. 1, control valves 11.1 to 11.5 are disposed in each of the gas withdrawal lines prior to their entry into the collection pipe 12. The sensors for determining the $O_2$ content (or nitrogen content, etc.) are in this embodiment disposed ahead of the valves when viewed in the direction of flow. The control of the gas withdrawal is effected in the manner previously described.

The measuring and control unit 17 is furthermore provided with an indicator 25 for displaying the quantity and energy content of the gas conveyed in the delivery pipe 14. The measuring and control unit 17 receives the values required for this purpose from a flow measuring device 24 disposed in the delivery pipe 14. The output signal of the flow measuring device 24 is transmitted via a line 22 to the measuring and control unit 17.

Pursuant to a further embodiment of the present invention, the values determined by the sensors 10.1 to 10.5, and/or the quantity of the gas conveyed, may be transmitted via a line 26 to a central control station 30 that monitors a number of control centers 19, and stores and subsequently processes the values transmitted therefrom for statistical analyses, determination of consumption, etc. Errors can also be recognized by the central control station 30 with the aid of the transmitted data. The central control station 30 can be located, for example, 100 to 500 km or even further from the refuse dump 1 since only electrical signals have to be transmitted. In order to have a static-free transmission of signals, it can be advantageous to digitallize the signals. The measured values obtained in the control center 19 are preferably stored and remotely transmitted to the central control station, for example only one time a day or at some other desirable time interval. In topographically unfavorable circumstances, it can be expedient to transmit the data to the central control station by radio rather than via a line 26.

Furthermore, it is advantageous to adapt the conveying capacity of the conveying mechanism 13 to the quantity of gas requested by the consumer. For this purpose, conveying capacities can be transmitted to the measuring and control unit 17 via the line 26. The measuring and control unit 17 then appropriately varies the delivery rate of the conveying mechanism 13 via the control line 23. In addition, by varying the conveying capacity, the withdrawal of the gaseous decomposition products from the gas wells 8 can also be cumulatively controlled. Thus, it is possible to effect an approximate preliminary control of the overall gas flow with the conveying mechanism 13, and a fine adjustment of each individual gas flow of a given line 9 with the control valves 11.

Figure 3:
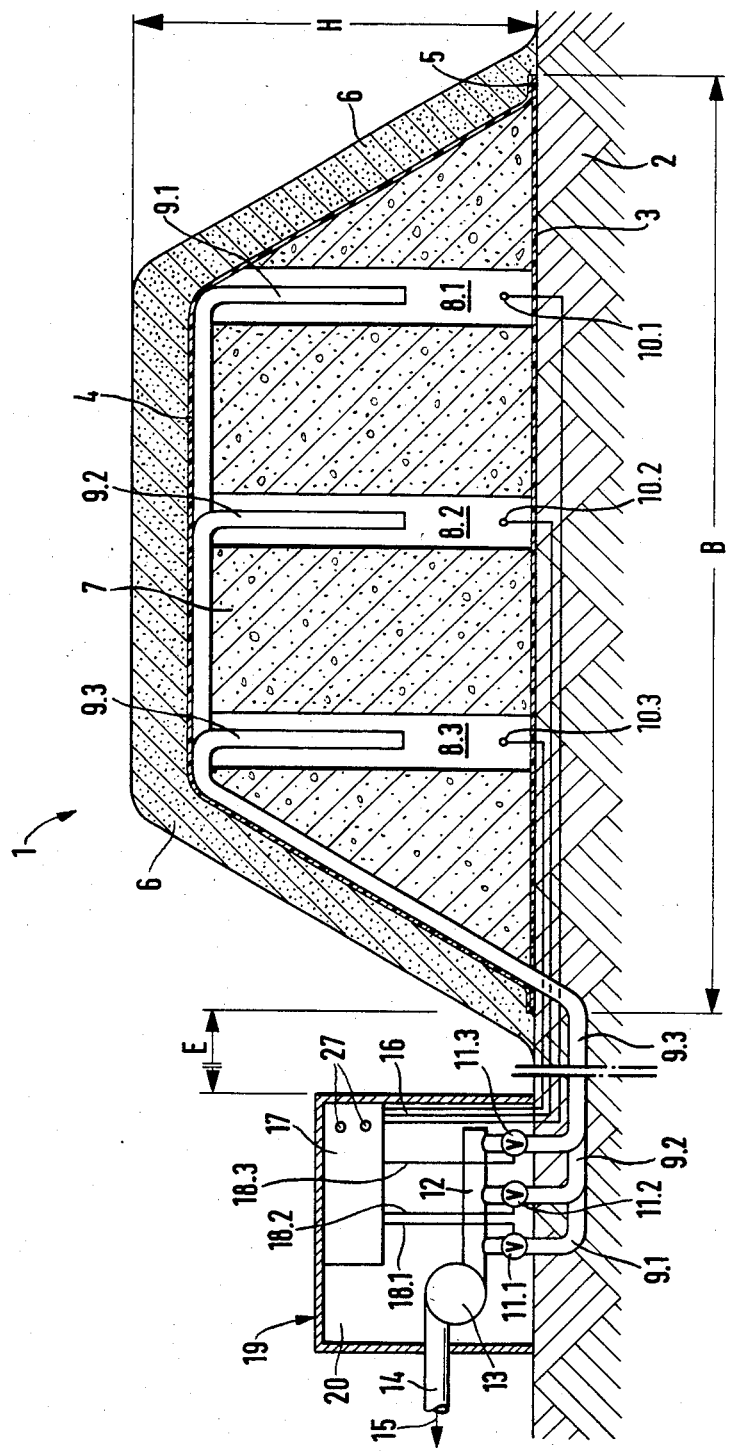
FIG. 3 is a cross sectional view of another inventive arrangement of a refuse dump and control center where the sensors are disposed in the gas collection mechanisms.

When viewed in the direction of flow in a gas withdrawal line 9, a sensor 10 can be provided ahead of or after a control valve 11. It can also be advantageous to dispose the sensor directly in or at the gas well 8 (FIG. 3), with the electrical output signals of the sensors being transmitted to the measuring and control unit 17 in the control center 19 via lines which can preferably also be guided in the gas withdrawal line. Furthermore, for certain applications, it can be expedient to provide the sensors 10, the measuring and control unit 17, the valves 11 of the gas withdrawal lines 9, and the conveying mechanism 13 in the immediate vicinity of the refuse dump 1. The measuring and control unit 17, which is electrically connected with the sensors 10, the valves 11, and possibly the conveying mechanism 13, can then be disposed in a control center 19 at a distance from the former. In this manner, the gas withdrawal lines 9 do not have to lead all the way to the control center 19.

It can be advantageous, to control the anaerobic decomposition process in the refuse, to provide a conduit system for the supply of heat (warm water). A drainage system for the wetting and drainage of the refuse 7 accommodated in the chamber can also be advantageous.

In the embodiment of FIG. 1, adjacent, spaced-apart and preferably vertical gas wells 8 are provided. In place of the gas wells, it can be expedient to provide gas-drainage-pipe systems that are separated from one another. Thus, with certain types of refuse, it can be advantageous to provide separate gas-drainage-pipe systems in various layers of the refuse dump. Each gas-drainage-pipe system of a given layer would then be connected to a separate gas withdrawal line which, as in the illustrated embodiment, would lead to a control center and be appropriately regulated.

Figure 4:
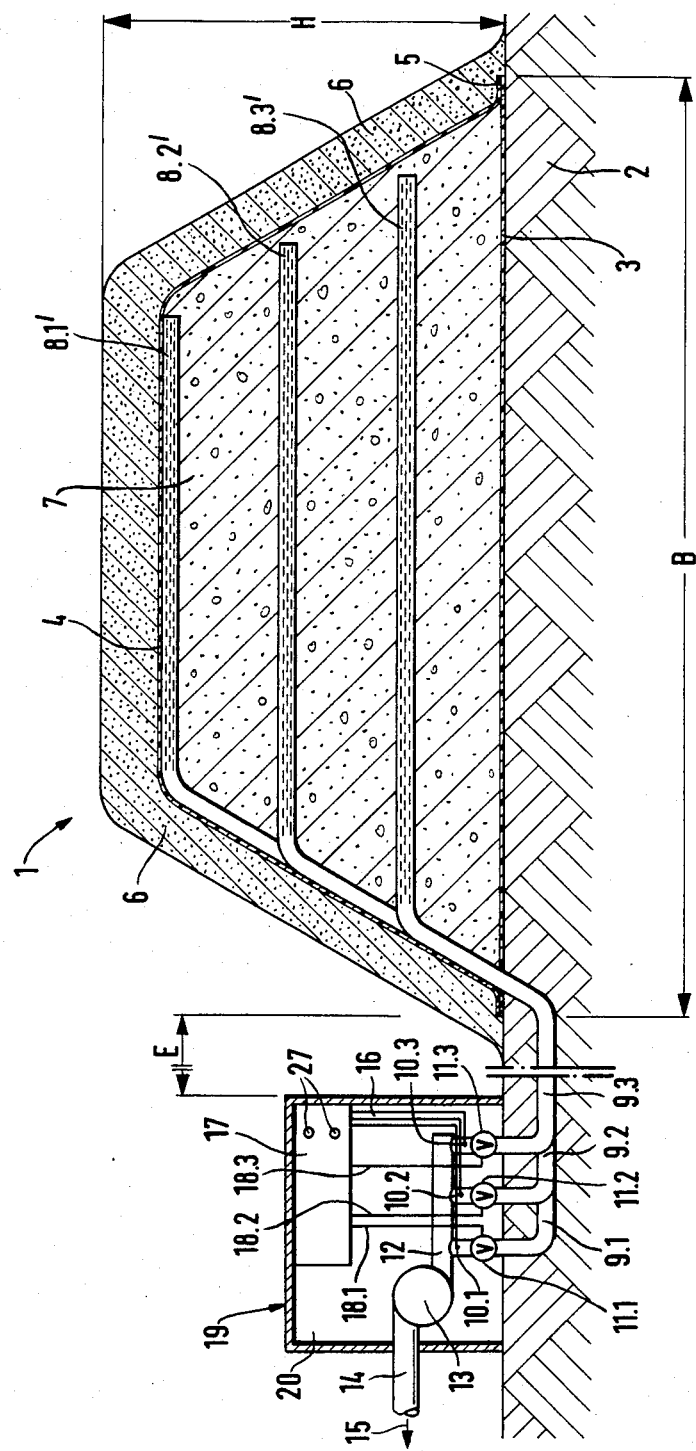
FIG. 4 is a cross-sectional view of a further inventive arrangement of a control center and refuse dump having horizontal gas drainage.

The refuse dump illustrated in FIG. 4 is drained or exhausted with the same apparatus and pursuant to the same method as described above; however, in this embodiment the gas collector mechanism 8.1', 8.2', and 8.3' are horizontally disposed in the refuse 7. The gas collector mechanism 8' is schematically illustrated as perforated pipes. However, other gas drainage systems could also be used, such as a fine gravel drainage system or the like.

It should be noted that it is also possible to provide an alarm, for example in the form of an audible signal or the indicator lamp 29 illustrated in FIG. 2. This alarm can be integrated with the measuring and control unit 17 to signal that a threshold value has been breached.

The present invention is, of course, in no way restricted to the specific disclosure of the specification and drawings, but also encompasses any modifications within the scope of the appended claims.

What I claim is:

1. A method of measuring and controlling the withdrawal of decomposition gas having uniform consumer value assured from a refuse dump which can lie above ground or depressed in the ground via an arrangement for withdrawing gaseous decomposition products, said arrangement including gas collection mechanisms disposed at a distance from one another in various locations in the refuse; the gaseous decomposition products are conveyed from said gas collection mechanisms to a gas collector, and are then supplied to a consumer via a delivery pipe; said method comprising the steps of:
   conveying said gaseous decomposition products that accumulate in each of said gas collection mechanisms to said gas collector via separate gas flows;
   determining and measuring concentration of the gaseous decomposition products in each of said gas flows, each of which is associated with a given one of said gas collection mechanisms in the refuse dump; and
   restricting a given gas flow when said concentration of a gaseous deçomposition product selected from the group consisting of nitrogen, carbon dioxide, methane and oxygen exceeds a predetermined first threshold value, and increasing a given gas flow when said concentration of the gaseous decomposition product falls below a predetermined second threshold value for continuously and critically controlling gas flow corrected for conveying thereof uniformly in consumer value under pressure from the gas collector as a consumer based upon sensing proportionally as to concentration of the decomposition gas.

2. An arrangement for withdrawing gaseous decomposition products form a refuse dump which can lie above ground or depressed in the ground in which refuse is deposited in a substantially gastight chamber on one hand to prevent air penetration into the refuse and on the other hand to prevent any uncontrolled exit of decomposition products from the refuse dump whereby simultaneously control of decomposition products occurs having such constituents so that uniform consumer value thereof is assured; gas collection mechanisms are disposed at a distance from one another in various locations in said refuse, with gaseous decomposition products being withdrawn from said gas collection mechanisms via gas withdrawal lines; said arrangement comprising:

a separate gas withdrawal line associated with each of said gas collection mechanisms;

a gas collector into which all of said gas withdrawal lines open;

withdrawal means with which said gaseous decomposition products are withdrawn from said collector for further use;

a respective regulatable shutoff device disposed in each of said gas withdrawal lines;

at least one sensor associated with each of said gas withdrawal lines for determining and measuring concentration of said gaseous decomposition products therein; and a measuring and control unit with which each of said sensors is connected for transmitting signals thereto when said concentration of said gaseous decomposition product selected from the group consisting of nitrogen, carbon dioxide, methane and oxygen, exceeds a predetermined first threshold value and for increasing a given gas flow when said concentration falls below a predetermined second threshold value, as a function of a signal transmitted to it from a given sensor, said measuring and control unit having means for regulating the shutoff device associated with that given sensor for continuously and critically controlling gas flow corrected for conveying thereof uniformly in consumer value under pressure from the gas collector as a consumer based upon sensing proportionally as to concentration of the decomposition gas.

3. An arrangement according to claim 2, in which one of said shutoff devices is disposed in each of said gas withdrawal lines in the vicinity of said collector.

4. An arrangement according to claim 3, in which, when viewed in the direction of flow of said gaseous decomposition products in a given one of said gas withdrawal lines, said sensor is disposed prior to said shutoff device.

5. An arrangement according to claim 3, in which, when viewed in the direction of flow of said gaseous decomposition products in a given one of said gas withdrawal lines, said sensor is disposed after said shutoff device.

6. An arrangement according to claim 2, in which said sensor associated with a given gas withdrawal line is disposed in the gas collection mechanism that is associated that given gas withdrawal line.

7. An arrangement according to claim 2, in which said sensors output signals that are proportional to the $O_2$ content of said gaseous decomposition products.

8. An arrangement according to claim 2, in which said sensors emit output signals that are proportional to the $N_2$ content of said gaseous decomposition products.

9. An arrangement according to claim 2, in which said withdrawal means includes a conveying mechanism for effecting withdrawal of said gaseous decomposition products from said collector and supply thereof to a delivery pipe; and which includes a flow measuring device for detecting the volume of said gaseous decomposition products in said delivery pipe, and for transmitting a corresponding output signal to said measuring and control unit.

10. An arrangement according to claim 9, which includes a central station, with data determined by said measuring and control unit being transferable to said central control station via a line.

11. An arrangement according to claim 9, in which the conveying capacity of said conveying mechanism is regulatable by said measuring and control unit in conformity with predetermined parameters.

12. An arrangement according to claim 9, which includes a housing for said measuring and control unit, with the latter including an alarm mechanism that is integrated in said housing.

13. An arrangement according to claim 9, which includes a structure in which said collector, said conveying mechanism, and said measuring and control unit are disposed; and in which each of said gas withdrawal lines is guided out of said chamber in an airtight manner, and then opens into said collector.

14. An arrangement according to claim 13, in which said structure is a container.

15. An arrangement according to claim 13, in which said gas withdrawal lines are guided along the chamber walls in said refuse, are guided in the ground outside said chamber, and are guided through the base of said structure into the interior thereof.

16. An arrangement according to claim 2, in which each of said gas collection mechanisms is an approximately vertically disposed gas well having gas-permeable walls.

17. An arrangement according to claim 16, in which each of said gas wells extends over the entire height of said chamber in which said refuse is deposited.

18. An arrangement according to claim 2, in which each of said gas collection mechanisms is a horizontal drainage system.

19. An arrangement according to claim 2, in which said sensors emit output signals that are proportional to the $CH_4$ content of said gaseous decomposition products.

20. An arrangement according to claim 2, in which said sensors emit output signals that are proportional to the $CO_2$ content of said gaseous decomposition products.

* * * * *